United States Patent
Karaoguz et al.

(10) Patent No.: US 8,832,221 B2
(45) Date of Patent: Sep. 9, 2014

(54) MANAGEMENT OF MULTIMEDIA DISPLAY CONTENT IN A MEDIA EXCHANGE NETWORK

(75) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 926 days.

(21) Appl. No.: 12/207,471

(22) Filed: Sep. 9, 2008

(65) Prior Publication Data

US 2009/0007212 A1 Jan. 1, 2009

Related U.S. Application Data

(63) Continuation of application No. 10/675,084, filed on Sep. 30, 2003, now Pat. No. 7,424,535.

(60) Provisional application No. 60/482,385, filed on Jun. 25, 2003, provisional application No. 60/432,472, filed on Dec. 11, 2002, provisional application No. 60/443,894, filed on Jan. 30, 2003.

(51) Int. Cl.
*G06F 15/16* (2006.01)
*G06F 13/00* (2006.01)
(Continued)

(52) U.S. Cl.
CPC ............ *H04L 67/06* (2013.01); *H04N 21/2408* (2013.01); *H04L 2012/2849* (2013.01); *H04N 21/41422* (2013.01); *H04N 21/6583* (2013.01);

(Continued)

(58) Field of Classification Search
USPC ........................................................ 709/217
See application file for complete search history.

(56) References Cited

U.S. PATENT DOCUMENTS 5,721,815 A 2/1998 Ottesen et al.
5,721,878 A 2/1998 Ottesen et al.
(Continued)

*Primary Examiner* — Brian P Whipple
*Assistant Examiner* — James Edwards
(74) *Attorney, Agent, or Firm* — Garlick & Markison; Kevin L. Smith

(57) ABSTRACT

A system and method for managing multimedia display content in a communication network is disclosed. An embodiment of the present invention may support the selection, scheduling, and delivery of media from a set top box at a first location to a multimedia display at a second location, using a communication network. The selection and scheduling may be performed via a user interface having at least one view comprising a representation of at least one media channel. The media delivered may comprise at least one of audio, a still picture, video, real time video, and data. The multimedia display may comprise a liquid crystal display, a plasma display, "electronic paper", or a light emitting diode (LED) display. The multimedia display may be communicatively coupled to a set top box at the second location via a wireless link, and may comprise at least one sensor for detecting conditions such as, for example, the movement of a viewer. The display may change if the sensor detects the condition.

32 Claims, 14 Drawing Sheets

(51) Int. Cl.

| | | |
|---|---|---|
| H04N 21/24 | (2011.01) | |
| H04N 21/414 | (2011.01) | |
| H04N 21/6583 | (2011.01) | |
| H04N 21/258 | (2011.01) | |
| H04N 21/63 | (2011.01) | |
| H04N 21/475 | (2011.01) | |
| H04N 21/4627 | (2011.01) | |
| H04N 21/422 | (2011.01) | |
| H04N 21/2743 | (2011.01) | |
| H04N 21/433 | (2011.01) | |
| H04N 21/643 | (2011.01) | |
| H04L 29/08 | (2006.01) | |
| H04N 21/472 | (2011.01) | |
| H04N 21/482 | (2011.01) | |
| H04N 21/418 | (2011.01) | |
| H04N 21/61 | (2011.01) | |
| H04N 21/4227 | (2011.01) | |
| H04N 21/458 | (2011.01) | |
| H04N 21/254 | (2011.01) | |
| H04N 21/41 | (2011.01) | |
| H04N 21/4788 | (2011.01) | |
| H04N 7/14 | (2006.01) | |
| H04N 21/466 | (2011.01) | |
| H04N 7/16 | (2011.01) | |
| H04N 21/485 | (2011.01) | |
| H04L 29/06 | (2006.01) | |
| H04N 21/658 | (2011.01) | |
| H04N 21/231 | (2011.01) | |
| H04N 7/173 | (2011.01) | |
| H04N 21/442 | (2011.01) | |
| H04N 21/2668 | (2011.01) | |
| H04N 21/4363 | (2011.01) | |
| H04N 21/431 | (2011.01) | |
| H04N 21/81 | (2011.01) | |
| H04N 21/426 | (2011.01) | |
| H04N 21/436 | (2011.01) | |
| H04N 21/462 | (2011.01) | |
| H04N 21/84 | (2011.01) | |
| H04N 7/18 | (2006.01) | |
| H04N 21/2543 | (2011.01) | |
| H04N 21/4786 | (2011.01) | |
| H04N 21/222 | (2011.01) | |
| H04N 21/6587 | (2011.01) | |
| H04N 21/2343 | (2011.01) | |
| H04N 21/637 | (2011.01) | |
| H04N 21/6402 | (2011.01) | |
| H04N 21/4143 | (2011.01) | |
| H04N 21/4223 | (2011.01) | |
| H04N 21/262 | (2011.01) | |
| H04N 21/488 | (2011.01) | |
| H04N 21/4782 | (2011.01) | |
| H04N 21/45 | (2011.01) | |
| H04N 21/2747 | (2011.01) | |
| H04N 21/4402 | (2011.01) | |
| H04L 12/28 | (2006.01) | |
| H04N 21/47 | (2011.01) | |
| H04N 5/44 | (2011.01) | |

(52) U.S. Cl.
CPC ....... *H04N 21/25875* (2013.01); *H04N 21/632* (2013.01); *H04L 2012/2841* (2013.01); *H04N 21/4755* (2013.01); *H04N 21/4627* (2013.01); *H04N 21/422* (2013.01); *H04N 21/2743* (2013.01); *H04N 21/4334* (2013.01); *H04N 21/4751* (2013.01); *H04N 21/64322* (2013.01); *H04N 21/47214* (2013.01); *H04N 21/4821* (2013.01); *H04L 67/327* (2013.01); *H04N 21/4182* (2013.01); *H04N 21/41407* (2013.01); *H04N 21/6143* (2013.01); *H04N 21/4227* (2013.01); *H04N 21/458* (2013.01); *H04N 21/254* (2013.01); *H04N 21/4135* (2013.01); *H04N 21/4788* (2013.01); *H04N 7/141* (2013.01); *H04N 21/4668* (2013.01); *H04L 12/2812* (2013.01); *H04N 7/163* (2013.01); *H04N 21/4856* (2013.01); *H04L 29/06027* (2013.01); *H04N 21/6581* (2013.01); *H04N 21/23106* (2013.01); *H04N 7/17318* (2013.01); *H04N 21/2541* (2013.01); *H04N 21/44222* (2013.01); *H04N 21/258* (2013.01); *H04N 21/2668* (2013.01); *H04N 21/43632* (2013.01); *H04N 21/25816* (2013.01); *H04L 12/2834* (2013.01); *H04N 21/4758* (2013.01); *H04N 21/4314* (2013.01); *H04L 67/325* (2013.01); *H04N 21/8113* (2013.01); *H04L 65/4084* (2013.01); *H04N 21/42684* (2013.01); *H04N 21/436* (2013.01); *H04N 21/482* (2013.01); *H04N 21/4622* (2013.01); *H04N 21/84* (2013.01); *H04N 7/18* (2013.01); *H04N 7/17309* (2013.01); *H04N 21/2543* (2013.01); *H04N 21/47* (2013.01); *H04N 21/4786* (2013.01); *H04N 21/222* (2013.01); *H04N 21/442* (2013.01); *H04L 65/4076* (2013.01); *H04N 21/8146* (2013.01); *H04N 21/6587* (2013.01); *H04N 21/4126* (2013.01); *H04N 21/6187* (2013.01); *H04N 7/17336* (2013.01); *H04N 21/4312* (2013.01); *H04L 12/2803* (2013.01); *H04N 21/4753* (2013.01); *H04N 21/25808* (2013.01); *H04N 21/47202* (2013.01); *H04N 21/814* (2013.01); *H04N 21/234363* (2013.01); *H04N 21/637* (2013.01); *H04N 21/4828* (2013.01); *H04N 21/25833* (2013.01); *H04N 21/6582* (2013.01); *H04N 21/6402* (2013.01); *H04N 21/43615* (2013.01); *H04N 21/4316* (2013.01); *H04N 21/4143* (2013.01); *H04L 67/306* (2013.01); *H04N 21/43637* (2013.01); *H04N 21/4223* (2013.01); *H04N 21/26266* (2013.01); *H04N 21/4882* (2013.01); *H04N 21/4826* (2013.01); *H04N 21/4782* (2013.01); *H04N 5/4401* (2013.01); *H04N 21/812* (2013.01); *H04N 21/2343* (2013.01); *H04N 21/4532* (2013.01); *H04N 21/2747* (2013.01); *H04N 21/440281* (2013.01); *H04N 21/6125* (2013.01); *H04N 21/25435* (2013.01)
USPC .......................................... 709/217; 725/51

(56) References Cited

U.S. PATENT DOCUMENTS

| | | | |
|---|---|---|---|
| 5,917,997 | A | 6/1999 | Bell et al. |
| 5,930,493 | A | 7/1999 | Ottesen et al. |
| 6,233,428 | B1 | 5/2001 | Fryer |
| 6,349,324 | B1 | 2/2002 | Tokoro |
| 6,477,708 | B1 | 11/2002 | Sawa |
| 6,480,889 | B1 | 11/2002 | Saito et al. |
| 6,631,247 | B1 | 10/2003 | Motoyama et al. |
| 6,643,658 | B1 | 11/2003 | Jai et al. |
| 6,693,896 | B1 | 2/2004 | Utsumi et al. |
| 7,003,795 | B2 | 2/2006 | Allen |
| 7,042,355 | B2 * | 5/2006 | Hunter et al. ................. 340/541 |
| 7,055,104 | B1 | 5/2006 | Billmaier et al. |
| 7,065,778 | B1 | 6/2006 | Lu |
| 7,075,573 | B2 | 7/2006 | Imaeda |

(56) References Cited

U.S. PATENT DOCUMENTS

| | | | |
|---|---|---|---|
| 7,080,400 B1* | 7/2006 | Navar | 725/139 |
| 7,424,535 B2 | 9/2008 | Karaoguz et al. | |
| 7,551,780 B2* | 6/2009 | Nudd et al. | 382/190 |
| 7,725,912 B2* | 5/2010 | Margulis | 725/81 |
| 8,474,703 B1* | 7/2013 | Grimm et al. | 235/379 |
| 2001/0021998 A1* | 9/2001 | Margulis | 725/81 |
| 2002/0016971 A1 | 2/2002 | Berezowski et al. | |
| 2002/0042915 A1* | 4/2002 | Kubischta et al. | 725/38 |
| 2002/0097978 A1* | 7/2002 | Lowry et al. | 385/147 |
| 2002/0138842 A1 | 9/2002 | Chong et al. | |
| 2002/0174425 A1* | 11/2002 | Markel et al. | 725/13 |
| 2002/0184635 A1* | 12/2002 | Istvan | 725/51 |
| 2003/0043272 A1 | 3/2003 | Nagao et al. | |
| 2003/0115585 A1 | 6/2003 | Barsness et al. | |
| 2003/0210332 A1* | 11/2003 | Frame | 348/216.1 |
| 2004/0003040 A1 | 1/2004 | Beavers et al. | |
| 2004/0103434 A1* | 5/2004 | Ellis | 725/58 |
| 2004/0155875 A1* | 8/2004 | Abe et al. | 345/211 |
| 2006/0195548 A1* | 8/2006 | Hunter et al. | 709/217 |
| 2007/0067810 A1* | 3/2007 | Durden et al. | 725/80 |
| 2007/0174886 A1 | 7/2007 | Scheuer et al. | |
| 2007/0198738 A1 | 8/2007 | Angiolillo et al. | |
| 2008/0172690 A1* | 7/2008 | Kanojia et al. | 725/36 |
| 2008/0184321 A1* | 7/2008 | Lemmons et al. | 725/100 |
| 2008/0230497 A1* | 9/2008 | Strickland et al. | 211/26 |
| 2009/0010612 A1* | 1/2009 | Allen et al. | 386/83 |
| 2009/0319379 A1* | 12/2009 | Joao | 705/14.73 |

\* cited by examiner

MANAGEMENT OF MULTIMEDIA DISPLAY CONTENT IN A MEDIA EXCHANGE NETWORK

CROSS-REFERENCE TO RELATED APPLICATIONS/INCORPORATION BY REFERENCE

This application is a continuation of U.S. patent application Ser. No. 10/675,084 entitled "MANAGEMENT OF MULTIMEDIA DISPLAY CONTENT IN A MEDIA EXCHANGE NETWORK", filed Sep. 30, 2003, now U.S. Pat. No. 7,424,535, which makes reference to, claims priority to, and claims the benefit of U.S. Provisional Patent Application Ser. No. 60/482,385, entitled "Management Of Multimedia Display Content In A Media Exchange Network", filed Jun. 25, 2003, U.S. Provisional Application Ser. No. 60/432,472, entitled "Personal Inter-Home Media Exchange Network", filed Dec. 11, 2002, and U.S. Provisional Application Ser. No. 60/443,894, entitled "Personal Access And Control Of Media Peripherals On A Media Exchange Network", filed Jan. 30, 2003, the complete subject matter of which are hereby incorporated herein by reference, in their entirety.

In addition, the applicants hereby incorporate the complete subject matter herein by reference, in their entirety, of U.S. Provisional Patent Application Ser. No. 60/461,717, entitled "Secure Media Peripheral Association With Authentication In A Media Exchange Network", filed Apr. 10, 2003, U.S. Provisional Patent Application Ser. No. 60/448,705, entitled "Media Exchange Network With Media Guide Interface", filed Feb. 18, 2003, U.S. Provisional Patent Application Ser. No. 60/457,179, entitled "Server Architecture Supporting A Personal Media Exchange Network", filed Mar. 25, 2003, U.S. patent application Ser. No. 10/657,390, entitled "Personal Inter-Home Media Exchange Network", filed Sep. 8, 2003, and U.S. patent application Ser. No. 10/660,267, entitled "Personal Access And Control Of Media Peripherals On A Media Exchange Network", filed Sep. 11, 2003. With respect to the present application, Applicant hereby rescinds any disclaimer of claim scope made in the parent application or any predecessor or related application. The Examiner is advised that any previous disclaimer of claim scope, if any, and the alleged prior art that it was made to allegedly avoid, may need to be revisited. Nor should a disclaimer of claim scope, if any, in the present application be read back into any predecessor or related application.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Most people enjoy displaying pictures of friends and family at various locations around their homes or at their place of work. In spite of the changes that may take place in those pictured, the same pictures are typically displayed for months or years. Still images of friends and family are most frequently shared in the form of photographic prints, while some individuals may share video with others in the form of videotapes and DVDs. Sending the latest photos or videos to friends or relatives requires the sender to get duplicate prints or copy a videotape or DVD, pack up the media, and ship it to the intended recipient. When received, the old pictures are removed from each of the frames and the new picture inserted. The viewing of video media is normally limited to a place where the necessary equipment resides.

Individuals that own photo scanners, digital cameras, or camcorders may send the latest pictures or video by attaching to an email message files containing the digital still images or digitized video. This method works for still and motion video, sound, and music, but does require that the sending and receiving parties be sufficiently savvy, and own the software tools needed to support the scanning/uploading, attaching, detaching, and displaying/playing that is involved. The files containing the digital media content can be quite large, and may require long upload/download times if a dial-up Internet connection is used. In addition, digital still photos must be printed if the recipient wishes to display them, and motion video must either be viewed on the screen of a PC, or written to a video tape or DVD to be viewed using a VCR or DVD player and a television set.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for communicating information, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the present invention relate to providing support for the exchange and enjoyment of digital media content. In particular, certain embodiments of the present invention enable the selection and transfer of multi-media content to digital multimedia displays using a media exchange network.

Figure 1A:
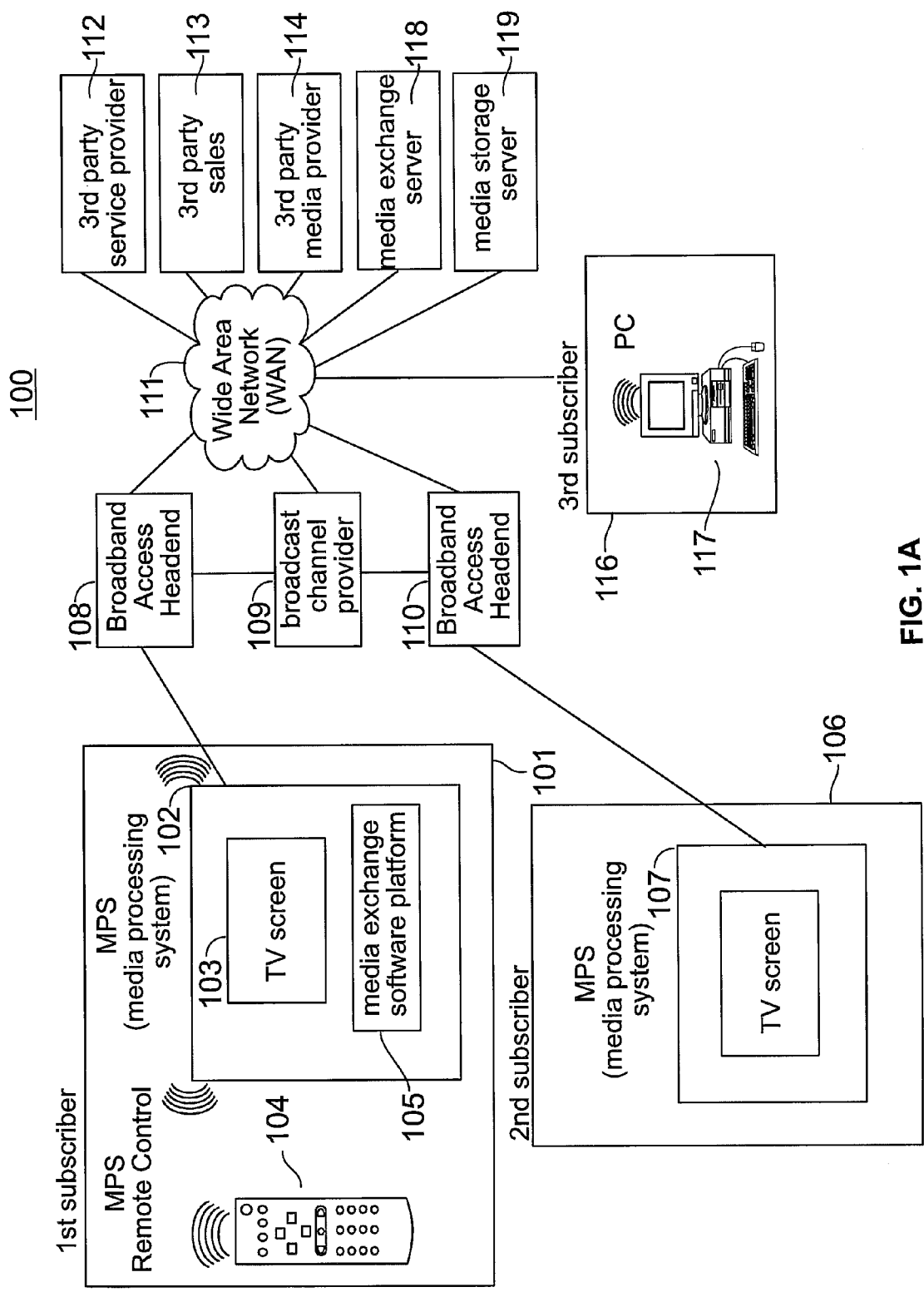
FIG. 1A is a block diagram illustrating a media exchange network in which an embodiment of the present invention may be practiced.

FIG. 1A is a block diagram illustrating a media exchange network 100 in which an embodiment of the present invention may be practiced. The media exchange network 100 is a communication network comprising a MPS (media processing system) 102 at a $1^{st}$ subscriber 101, a MPS 107 at a $2^{nd}$ subscriber 106, and a PC 117 at a third subscriber 116. The MPS 102 is connected to broadband access headend 108 which connects to WAN infrastructure 111. Likewise, the MPS 107 is connected to broadband access headend 110 which provides connectivity to WAN infrastructure 111. The WAN infrastructure 111 may comprise, for example, a wired network infrastructure, a wireless network infrastructure, an intranet infrastructure, an Internet infrastructure, a digital subscriber loop (DSL) infrastructure, or any combination of the above. The media exchange network 100 further comprises a $3^{rd}$ party service provider 112, a $3^{rd}$ party sales provider 113, a $3^{rd}$ party media provider 114, a media exchange server 118, a media storage server 119, and a broadcast channel provider 109. Wide-area network (WAN) infrastructure 111 provides connectivity between the MPS's 102, 107 and the PC 117, and permits access to $3^{rd}$ party service provider 112, $3^{rd}$ party sales provider 113, $3^{rd}$ party media provider 114, the media exchange server 118, the media storage server 119, and broadcast channel provider 109. The fact that illustration of FIG. 1A shows two MPS's 102, 107 and a single PC 117 is not intended to represent a limitation of the present invention. The media exchange network 100 may comprise any number of MPS's and PC's without departing from the spirit and scope of the present invention. Each of the entities within the media exchange network 100 may be identified using a network or protocol address such as, for example, an Internet protocol (IP) address, a media access control (MAC) address, and an electronic serial number (ESN).

The MPS's 102, 107 may be, for example, enhanced set-top-boxes. The MPS's 102, 107 may each include a TV screen such as the TV screen 103 of the MPS 102 for viewing and interacting with various user interfaces, media, data, and services that are available on the media exchange network 100 using, for example, a remote control such as the remote control 104 associated with the MPS 102. The PC 117 may include a PC monitor for viewing and interacting with various user interfaces, media, data, and services that are available on the media exchange network using, for example, a keyboard and mouse. The MPS's 102, 107 and the PC 117 include functional software to support interaction with the various elements of the media exchange network 100, in accordance with various embodiments of the present invention.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

For example, the MPS's 102, 107 and the PC 117 comprise a media exchange software (MES) platform 105. Further details of a media exchange software platform are provided below with respect to FIG. 3. The MES platform 105 on the MPS 102, and similarly the MES platforms on MPS 107 and PC 117, support personalized views of media channels and the set up of new media channels on the media exchange network 100. For example, the MES platform 105 provides a format, displayed on a monitor of the MPS 102, comprising a media guide user interface, or "channel view", to allow a user to set up a personalized view of the media guide user interface using a remote control 104. An example media guide user interface is described in U.S. Provisional Patent Application Ser. No. 60/448,705, entitled "Media Exchange Network With Media Guide Interface", filed Feb. 18, 2003, the complete subject matter of which is hereby incorporate herein in its entirety. The MES platform 105 also provides the functionality for a user of the MPS 102 to set up one or more media channels in his personalized view.

In general, the MPS's 102, 107 and the PC 117 each include a media exchange software (MES) platform and a networking component for connectivity. The MES platform provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface with a TV channel guide look-and-feel.

Figure 1B:
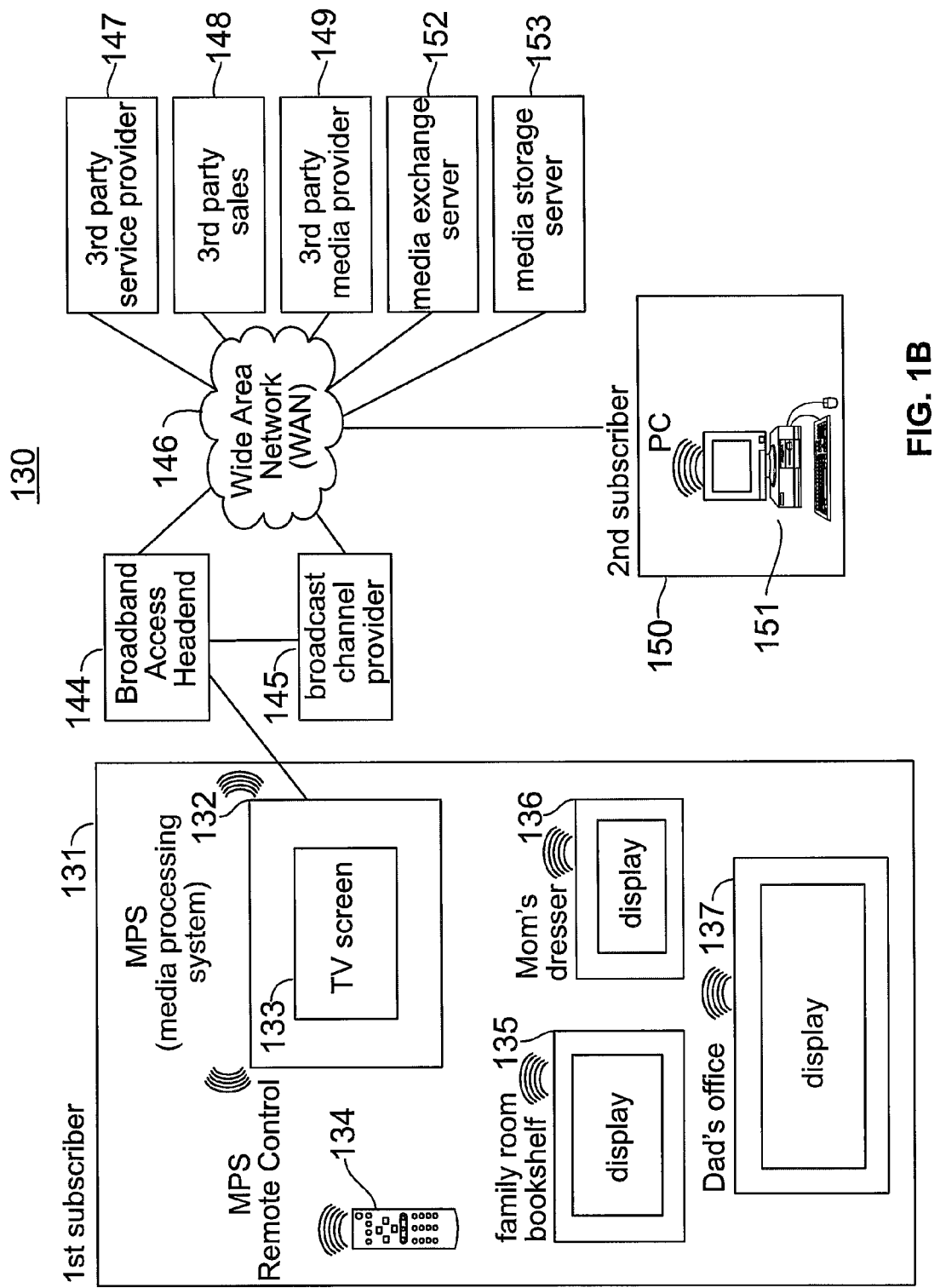
FIG. 1B is a block diagram illustrating an exemplary embodiment of a media exchange network supporting management of multimedia display content in a media exchange network, in accordance with the present invention.

FIG. 1B is a block diagram illustrating an exemplary embodiment of a media exchange network 130 supporting management of multimedia display content in a media exchange network, in accordance with the present invention. The media exchange network 130 of FIG. 1B is similar to the media exchange network 100 of FIG. 1A, and comprises a MPS 132 at a $1^{st}$ subscriber 131 and a PC 151 at a $2^{nd}$ subscriber 150. The media exchange network 130 further comprises a $3^{rd}$ party service provider 147, a $3^{rd}$ party sales provider 148, a 3$^{rd}$ party media provider 149, a media exchange server 152, a media storage server 153, and a broadcast channel provider 145. The wide-area network (WAN) infrastructure 146 provides connectivity between the MPS 132 and the PC 151, and permits access to 3$^{rd}$ party service provider 147, 3$^{rd}$ party sales provider 148, media exchange server 152, media storage server 153, and 3$^{rd}$ party media provider 149. The WAN infrastructure 146 may comprise, for example, a wired network infrastructure, a wireless network infrastructure, an intranet infrastructure, an Internet infrastructure, a digital subscriber loop (DSL) infrastructure, or any combination of the above. Although the illustration of FIG. 1B shows a particular complement of MPS's and PC's, the present invention is not limited in this regard. Each of the entities within the media exchange network 100 may be identified using a network or protocol address such as, for example, an Internet protocol (IP) address, a media access control (MAC) address, and an electronic serial number (ESN).

The MPS 132 of FIG. 1B may be, for example, an enhanced set-top-box and may include a TV screen and a remote control, such as the TV screen 103 and remote control 104 of the MPS 102 in FIG. 1A. The PC 151 may include a PC monitor, a keyboard, and mouse. The MPS 132 and the PC 151 include functional software to support interaction with the various elements of the media exchange network 130, in accordance with various embodiments of the present invention.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

In addition to the elements described above, the exemplary media exchange network of FIG. 1B comprises a "family room bookshelf" display 135, a "Mom's dresser" display 136, and a "Dad's office" display 137, which are located in proximity to MPS 132 and may be connected to MPS 132 via a wired or wireless link. In the illustration of FIG. 1B, the "family room bookshelf" display 135 may be, for example, a framed, 8" by 10", monochrome or color liquid crystal display and supporting circuitry. It may also comprise a plasma display, "electronic paper", a projection display, a light emitting diode (LED) display, or other display technology. The circuitry of the "family room bookshelf" display 135 may support a wireless link to the MPS 132 such as, for example, the IEEE 802.11b or related wireless network standard, a Bluetooth-based wireless network protocol, an infrared link, or other similar wireless communication protocol. The link between the MPS 132 and the "family room bookshelf" display 135 permits the MPS 132 to communicate with the "family room bookshelf" display 135 and to transfer digital media content representing one or more images for display on the "family room bookshelf" display 135. Such a transfer may be initiated through the MPS 132 using, for example, a remote control such as remote control 134, or it may be initiated from a remote location such as, for example, the PC 151 of the 2$^{nd}$ subscriber 150. In an embodiment in accordance with the present invention, any authorized and authenticated subscriber or provider having access to media exchange network 130 may transfer new media content for display on a multimedia display such as the "family room bookshelf" display 135.

In an embodiment of the present invention, the "family room bookshelf" display 135 may present, for example, a single image, a sequence of images, or motion video. A display such as the "family room bookshelf" display 135 may also support the playback of digitized audio. The "family room bookshelf" display 135 may also comprise a detector such as, for example, a visible light, passive infrared (PIR), microwave, or ultrasonic motion detector, for sensing the presence of a viewer, permitting the "family room bookshelf" display 135 to modify its operation (e.g., begins sequencing through a series of pictures, begin the playback of stored audio, etc.) when a viewer is present.

For example, in one embodiment of the present invention the image displayed on "Mom's dresser" display 136 may be an image of Mom's granddaughter, for whom a new picture is now available. In another embodiment, the "Mom's dresser" display 136 may be arranged to display a sequence of pictures of all of Mom's grandchildren, and a picture of a new grandchild may now be available to be added to the sequence. In either case, the digital media content representing the new picture may be stored on, for example, the PC 151 of 2$^{nd}$ subscriber 151 (e.g., Mom's son). In an embodiment in accordance with the present invention, the media content may, for example, be "pulled" from the PC 151 of 2$^{nd}$ subscriber 150 by the MPS 132 and provided to the "Mom's dresser" display 136, or it may be "pushed" by the PC 151 of the 2$^{nd}$ subscriber 150 through the MPS 132 to the "Mom's dresser" display 136. The media content may also reside on any of the other entities accessible via media exchange network 130 such as, for example, 3$^{rd}$ party service provider 147, 3$^{rd}$ party sales provider 148, 3$^{rd}$ party media exchange server 152, or 3$^{rd}$ party storage server 153. For instance, the 3$^{rd}$ party service provider 147 may push to the MPS 132 digital media content representing photos taken by Mom's friends. Those of Mom's friends who do not own a digital camera may deliver their film to the 3$^{rd}$ party service provider 147 for developing, and may request that the finished pictures be scanned and sent to Mom in digital form. Mom may then select from those images that media content to be transferred to the "Mom's dresser" display 136 using the MPS 132 and a remote control such as remote control 134.

In an embodiment in accordance with the present invention, a display such as "Dad's office" display 137 may be used to display still images, as described above with respect to "Mom's dresser" display 136 and the "Family room bookshelf" display 135. In addition, digitized images of artwork suitable for an office environment may be transferred periodically to the "Dad's office" display 137 by, for example, 3$^{rd}$ party service provider 147 or 3$^{rd}$ party sales provider 148, providing a change of scenery. The "Dad's office" display 137 may also be used to display the images generated by software applications such as word processors, spreadsheet programs, slide presentation packages, etc., resident on an MPS such as the MPS 132, or a PC such as PC 151. In another embodiment, the "Dad's office" display 137 may be used to display motion video of, for example, product presentations or continuing education materials. When equipped with a video camera (not shown), the "Dad's office" display 137 may also be used for video telephony.

In the exemplary media exchange network 130 of FIG. 1B, an MPS such as the MPS 132 of 1$^{st}$ subscriber 131, or the PC such as the PC 151 of 2$^{nd}$ subscriber 150 may be used to identify, select, and download digital content to the "family room bookshelf" display 135, the "Mom's dresser" display 136, and the "Dad's office" display 137. An example method for access and control of media peripherals such as the "family room bookshelf" display 135, the "Mom's dresser" display 136, and the "Dad's office" display 137 is described in U.S. Provisional Application Ser. No. 60/443,894, entitled "Personal Access And Control Of Media Peripherals On A Media Exchange Network", filed Jan. 30, 2003, the complete subject matter of which is hereby incorporated herein by reference, in its entirety.

In an embodiment in accordance with the present invention, the authentication and authorization functionality for the secure transfer of digital information between the MPS 132 and the "family room bookshelf" display 135, "Mom's dresser" display 136, and "Dad's office" display 137 of FIG. 1B may be enabled using digital certificates. The digital certificates may be embedded in the firmware or hardware of the "family room bookshelf" display 135, "Mom's dresser" display 136, and "Dad's office" display. The digital certificates may comprise certain information including, for example, a device ID, a public key for encryption, and possible other information related to services, payment terms, billing, and media push/access restrictions and limitations. An example of a system for securing transfer of digital media content in a media exchange network is described in U.S. Provisional Patent Application Ser. No. 60/461,717, entitled "Secure Media Peripheral Association With Authentication In A Media Exchange Network", filed Apr. 10, 2003, the complete subject matter of which is hereby incorporated herein by reference, in its entirety.

Figure 1C:
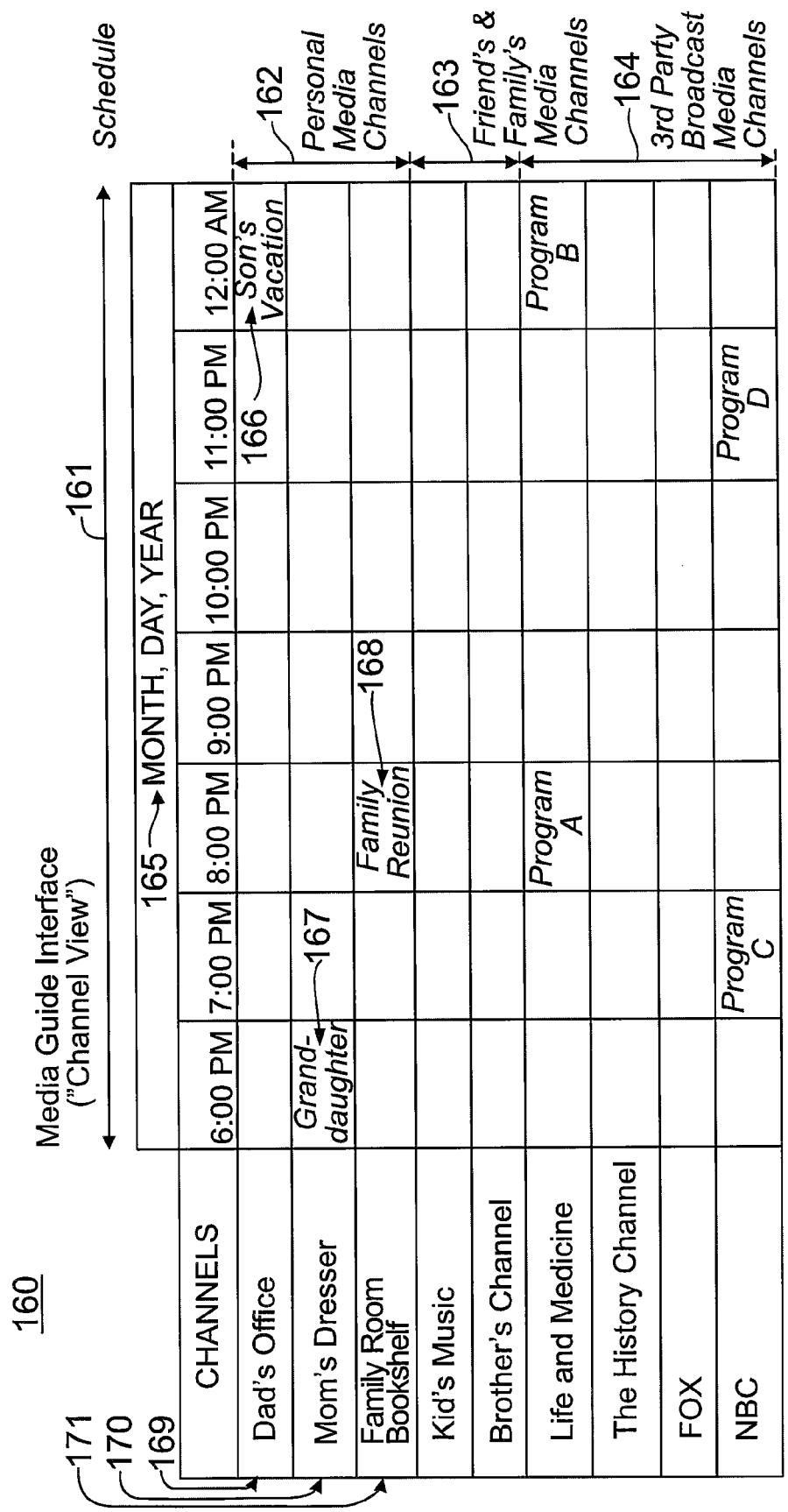
FIG. 1C is a diagram illustrating an exemplary embodiment of a media guide interface showing media channels supporting vehicle media peripherals such as those illustrated in FIG. 1B, in accordance with the present invention.

FIG. 1C is a diagram illustrating an exemplary embodiment of a media guide interface 160 showing media channels supporting vehicle media peripherals such as those illustrated in FIG. 1B, in accordance with the present invention. A media guide interface in accordance with that shown in FIG. 1C is described in U.S. Provisional Patent Application Ser. No. 60/448,705, entitled "Media Exchange Network With Media Guide Interface", filed Feb. 18, 2003, the complete subject matter of which is hereby incorporate herein, in its entirety. The diagram of FIG. 1C shows a media guide interface 160 in a tabular format comprising rows representing media channels, and columns containing program schedule information 161 for the date indicated by time period indicator 165. The media guide interface 160 is suitable for display on, for example, a TV screen or PC monitor such as the TV screen 133 of the MPS 132 or the PC monitor of the PC 151, both of which are illustrated in FIG. 1B.

The media guide interface 160 of FIG. 1C comprises "Personal" media channels 162, "Friends' and Family's" media channels 163, and "3$^{rd}$ Party Broadcast" media channels 164. In the example shown in the illustration of FIG. 1C, the "Personal" media channels 162 comprise three media channels 169, 170, 171 related to the "Dad's office" display 137, the "Mom's dresser" display 136, and the "family room bookshelf" display 135, respectively. The first media channel, "Dad's Office" 169, is scheduled to transfer the video of "Son's Vacation" 166 to the "Dad's office" display 137 of FIG. 1B, starting at 12:00 AM on the date indicated by time period indicator 165. This media content has been scheduled for transfer late at night, while Dad is out of the office and won't be affected.

The second of the "Personal" media channels 162, "Mom's dresser" 170, is scheduled to transfer a picture of "Granddaughter" 167 to the "Mom's dresser" display 136 of FIG. 1B at 6:00 PM. The media content may be pushed, for example, from the PC 151 of 2$^{nd}$ subscriber 150 (e.g., Mom's son), or from a 3$^{rd}$ party service provider that developed and digitized a roll of film taken by Mom's son. The media content transferred by the media channel "Mom's Dresser" 170 may also have been an image provided by, for example, the 3$^{rd}$ party sales provider 148, the media storage server 153, or any other authorized and authenticated entity having access to the media exchange network 130 of FIG. 1B, without departing from the spirit or scope of the present invention.

The last of the three "Personal" media channels 162, "Family Room Bookshelf" 171, is scheduled to transfer media content "Family Reunion" 168 comprising a series of digitized snapshots to the "family room bookshelf" display 135 of FIG. 1B, starting at 8:00 PM. Upon completion of the transfer, the "family room bookshelf" display 135 may immediately begin displaying the new media content, or it may wait until a predetermined time or the presence of someone in the proximity of the "family room bookshelf" display 135, before enabling the display of the new media content. The "family room bookshelf" display 135 may also play any audio contained in the media content "Family Reunion" 168, if the "family room bookshelf" display 135 is equipped for audio playback and is configured to do so.

Figure 2:
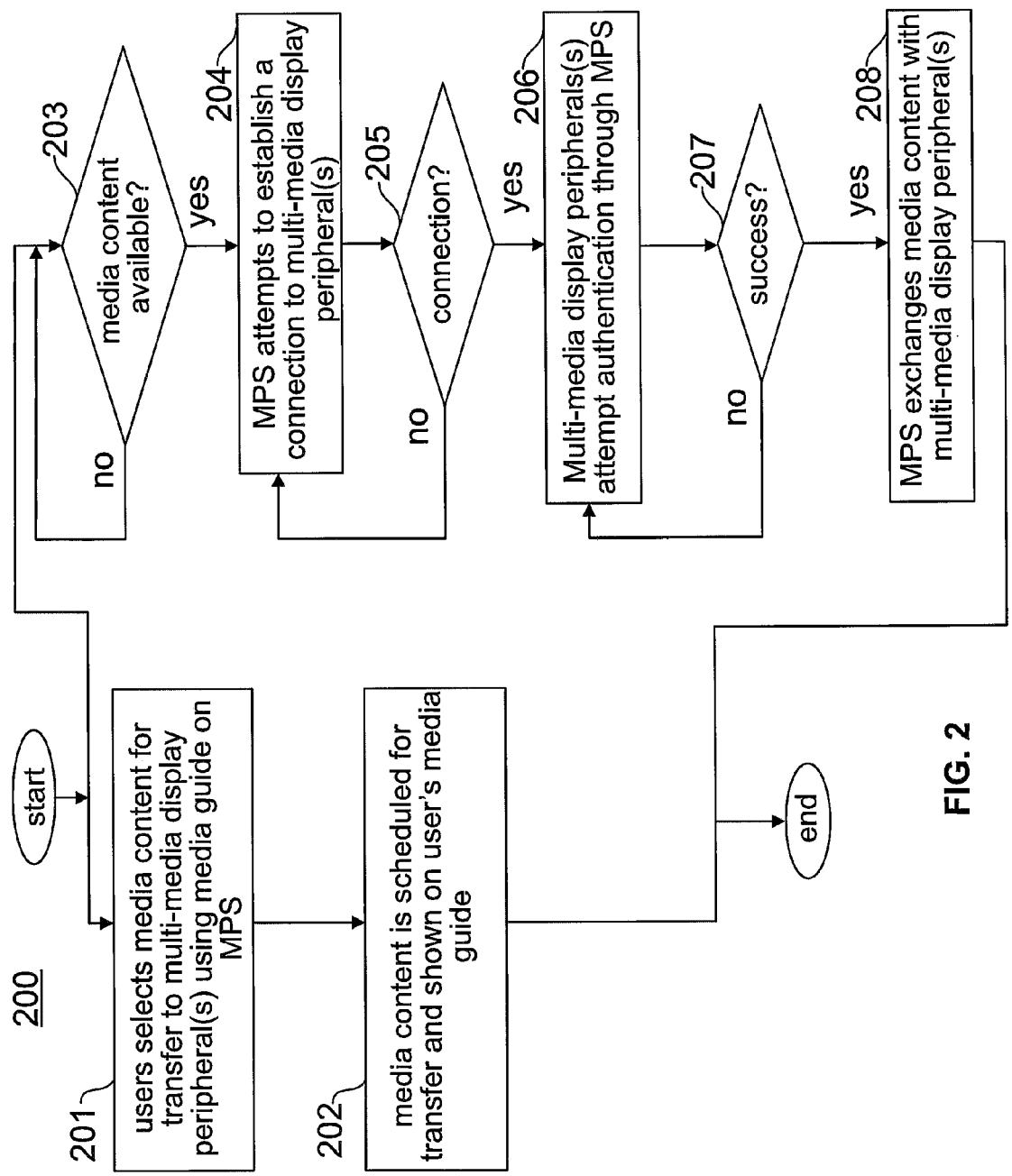
FIG. 2 is a flowchart illustrating an exemplary method of managing multimedia display content in a media exchange network, in accordance with the present invention.

FIG. 2 is a flowchart illustrating an exemplary method of managing multimedia display content in a media exchange network, in accordance with the present invention. The method illustrated in FIG. 2 is shown as two branches to illustrate the fact that the activities of the two branches may occur in parallel. The process outlined in the left branch begins with the user selecting media content for transfer to a multimedia display using a media guide on an MPS (block 201). The media content is then scheduled for transfer and an entry is shown on the user's media guide (block 202).

In the right branch of the illustration of FIG. 2, the MPS determines whether media content is available for transfer to a multimedia display (block 203). If media content is not currently available, the MPS continues to periodically check for media content. If media content is available, the MPS attempts to establish a connection to the multimedia display (block 204). If a connection to the multimedia display cannot be established, the MPS continues to periodically attempt to establish a connection (block 205). If a connection can be established, the multimedia display attempts to authenticate through the MPS (block 206). If the authentication is not successful, the multimedia display may make additional attempts at authentication (block 207). If authentication succeeds, the MPS exchanges media content with the multimedia display (block 208).

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
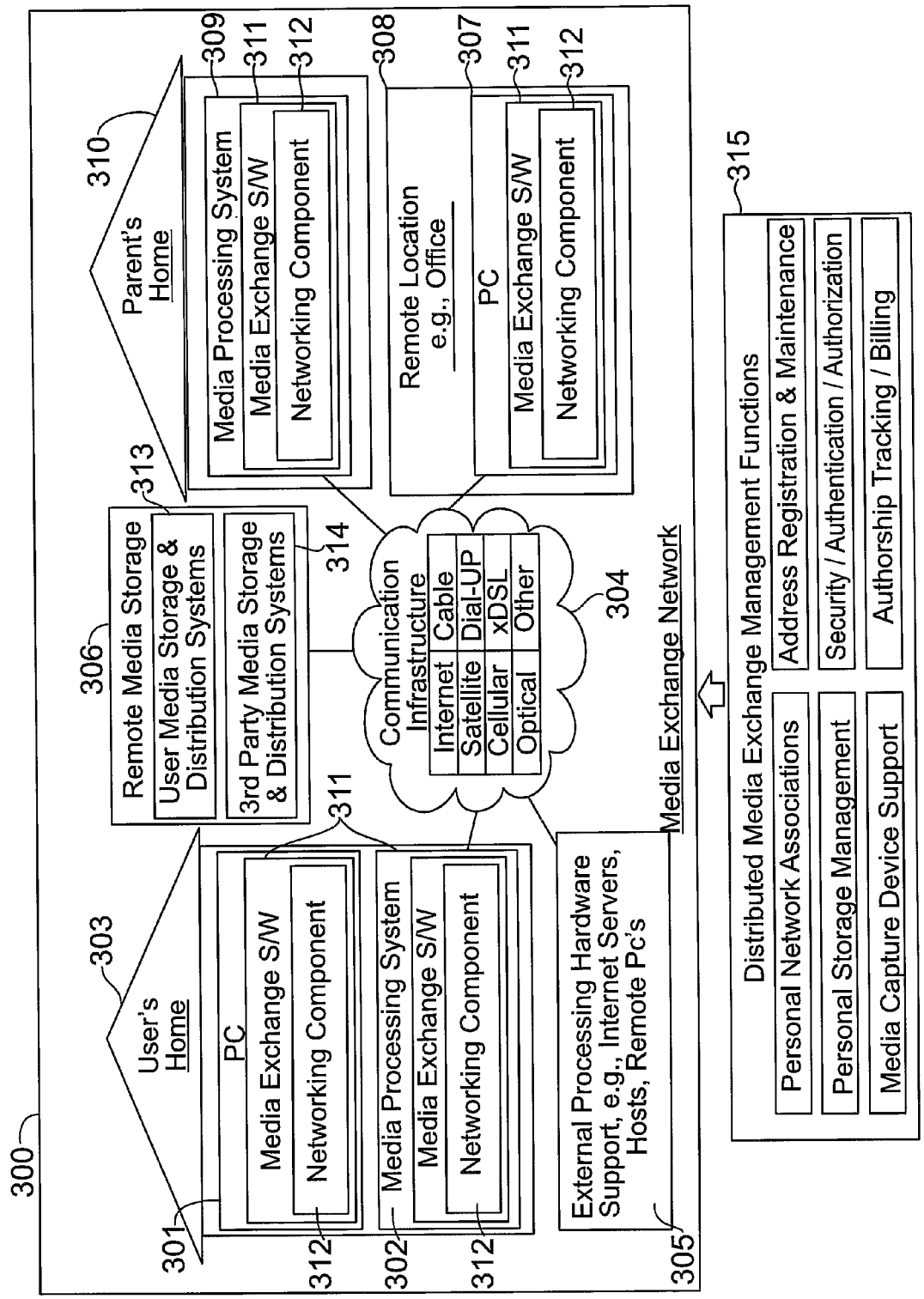
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, XDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
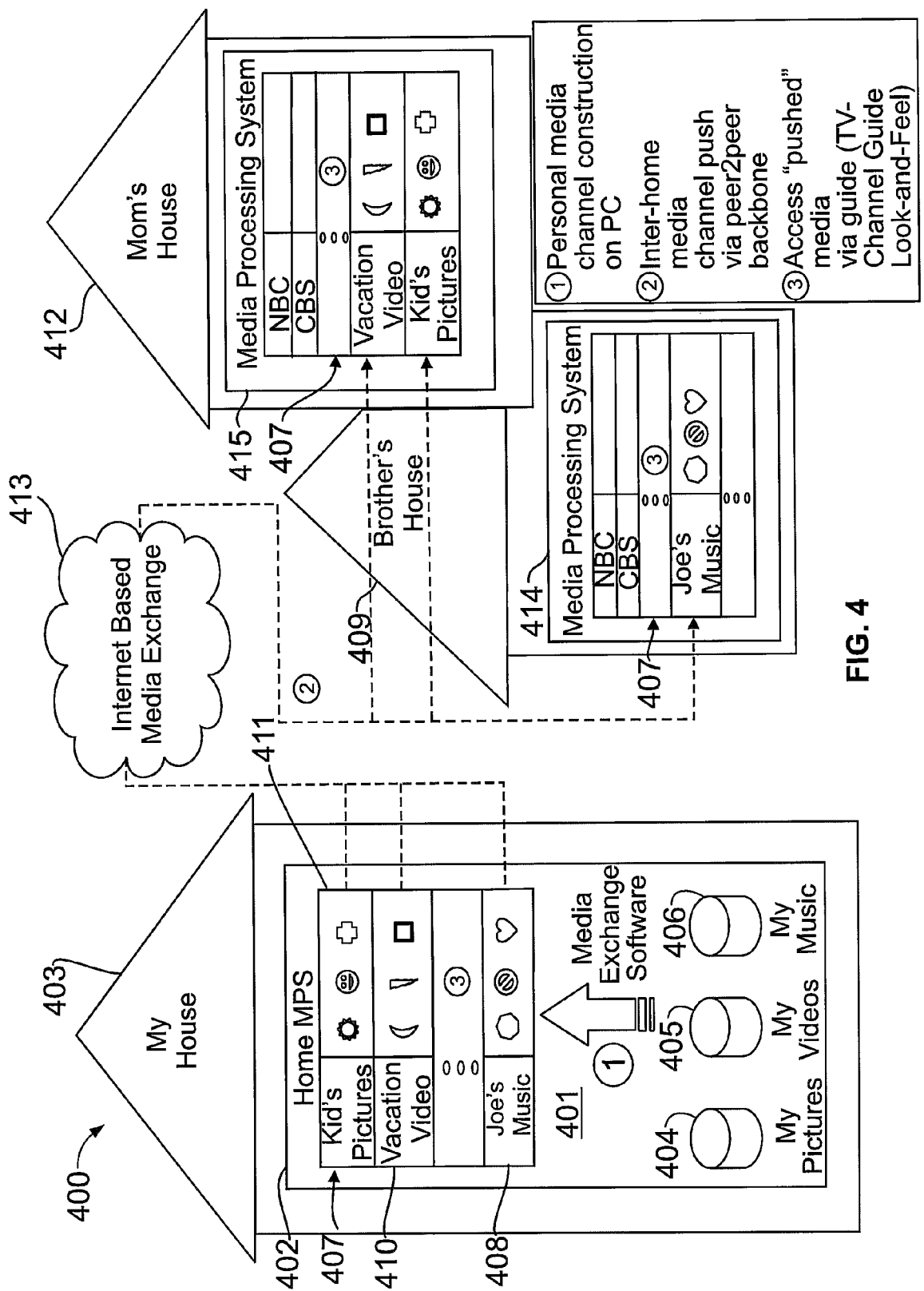
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
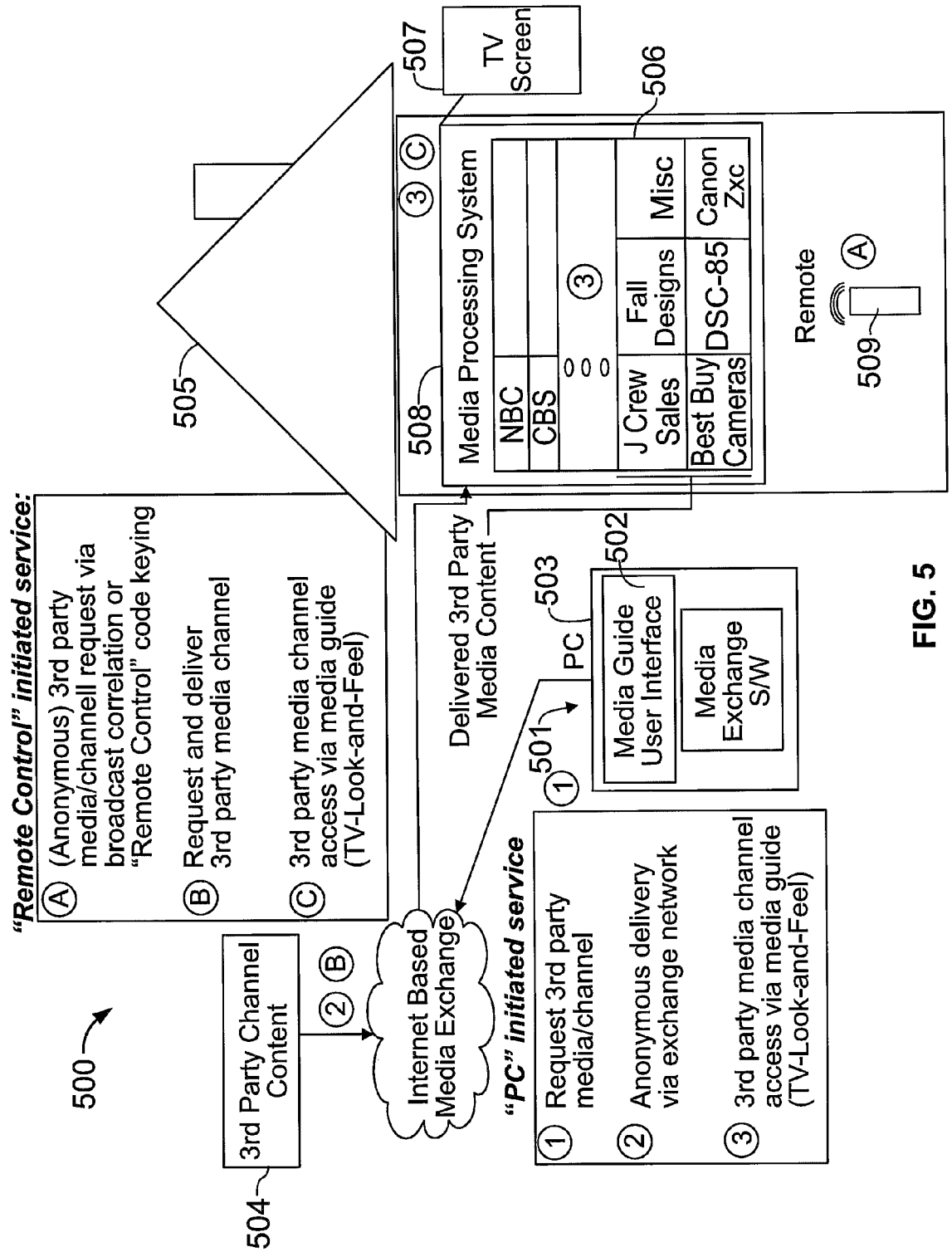
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
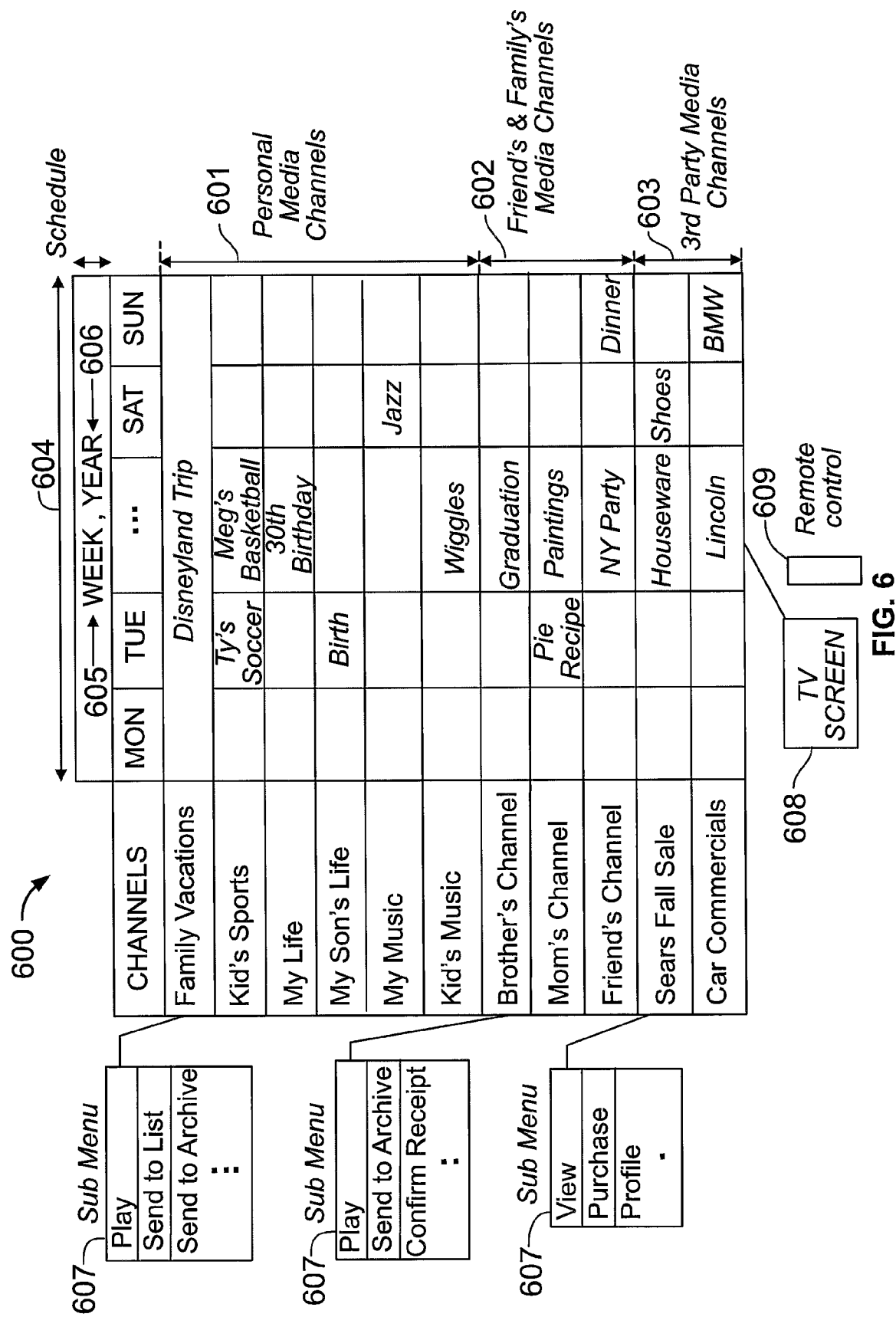
FIG. 6 is an exemplary illustration of a media guide user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu allows for selection of certain control and access functions such as "play", "send to list", "send to archive", "confirm receipt", "view", "purchase", and "profile".

Figure 7:
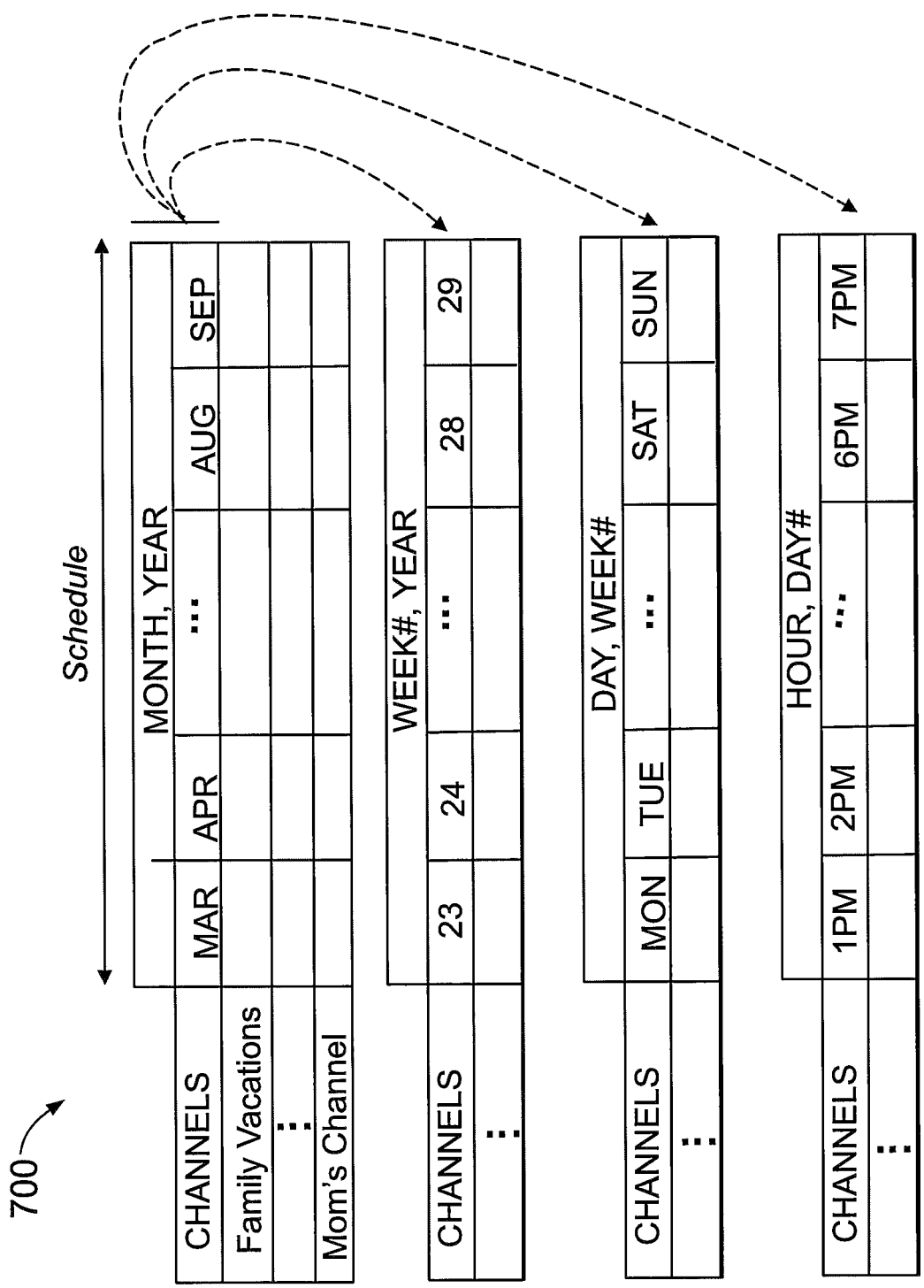
FIG. 7 is an exemplary illustration of several instantiations of a media guide user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Figure 8:
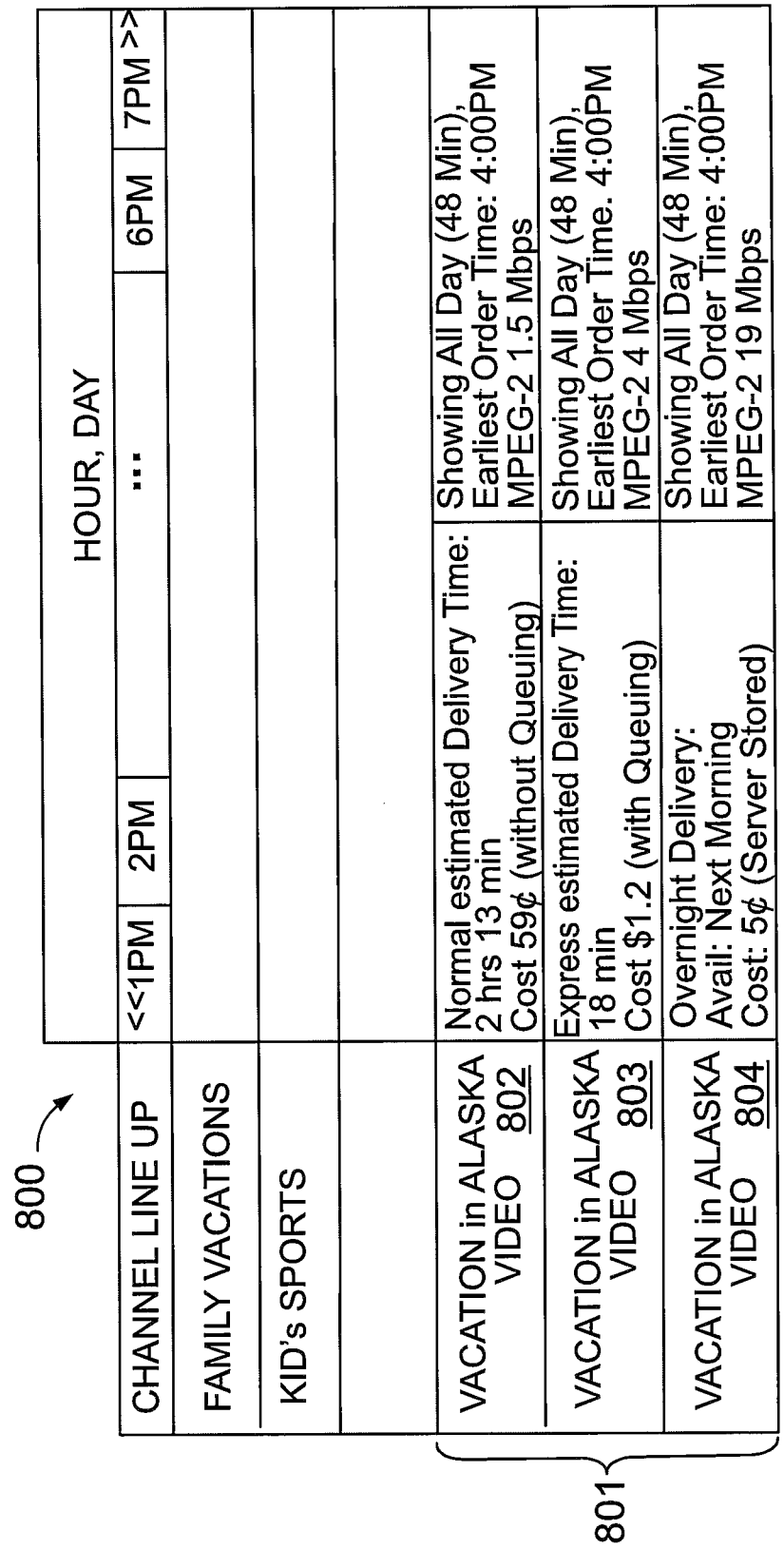
FIG. 8 is an exemplary illustration of a media guide user interface showing several options of a pushed media in accordance with an embodiment of the present invention.

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
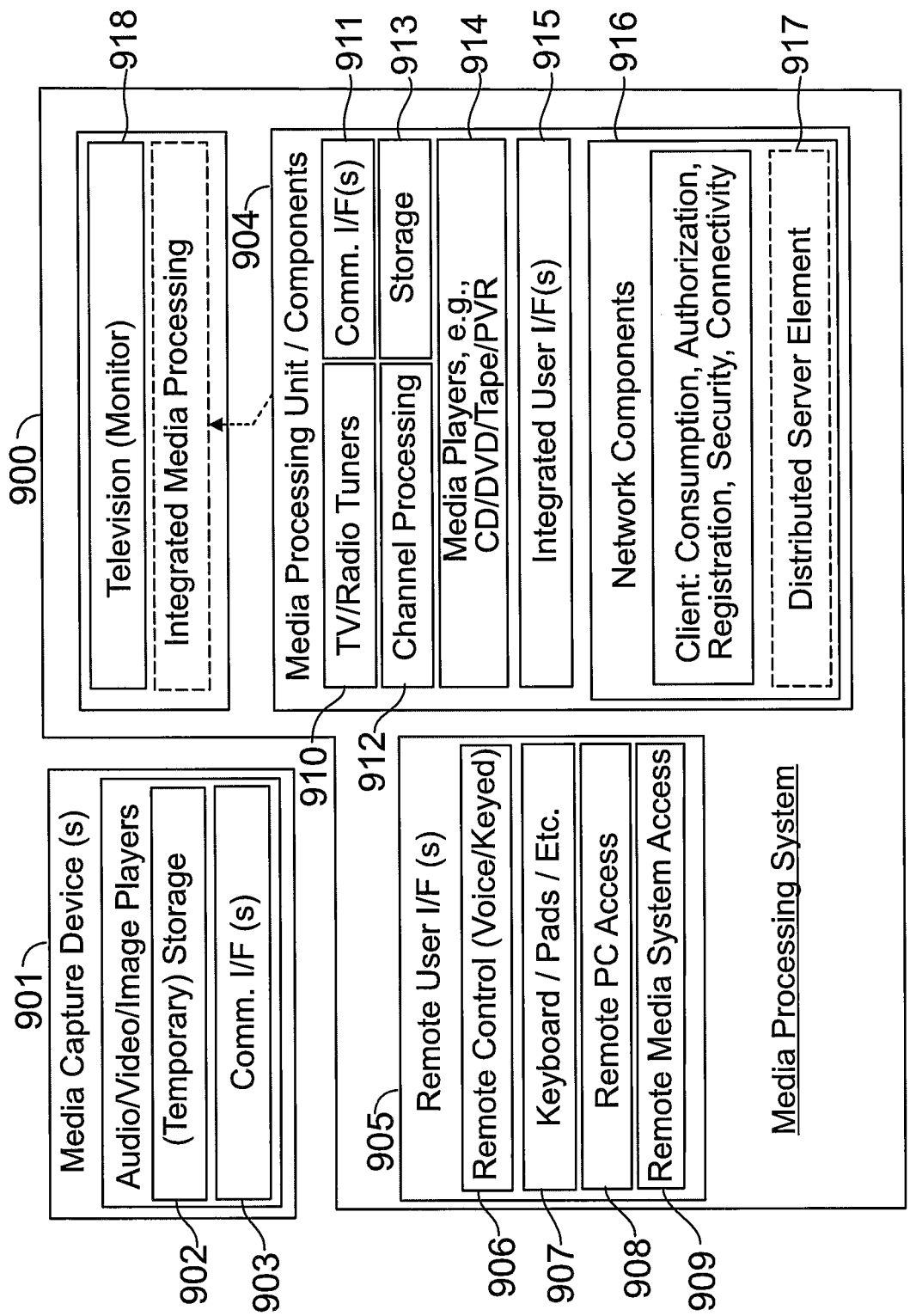
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
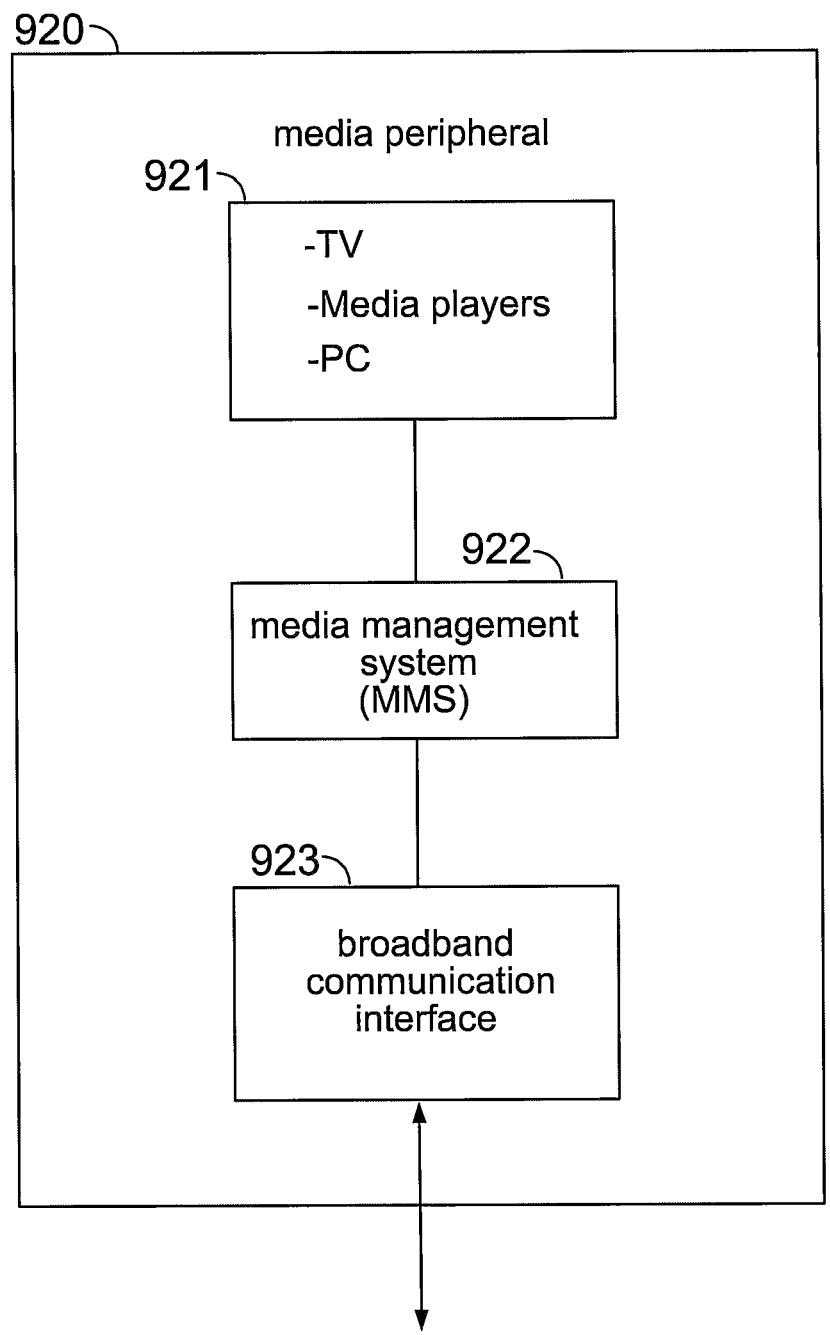
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
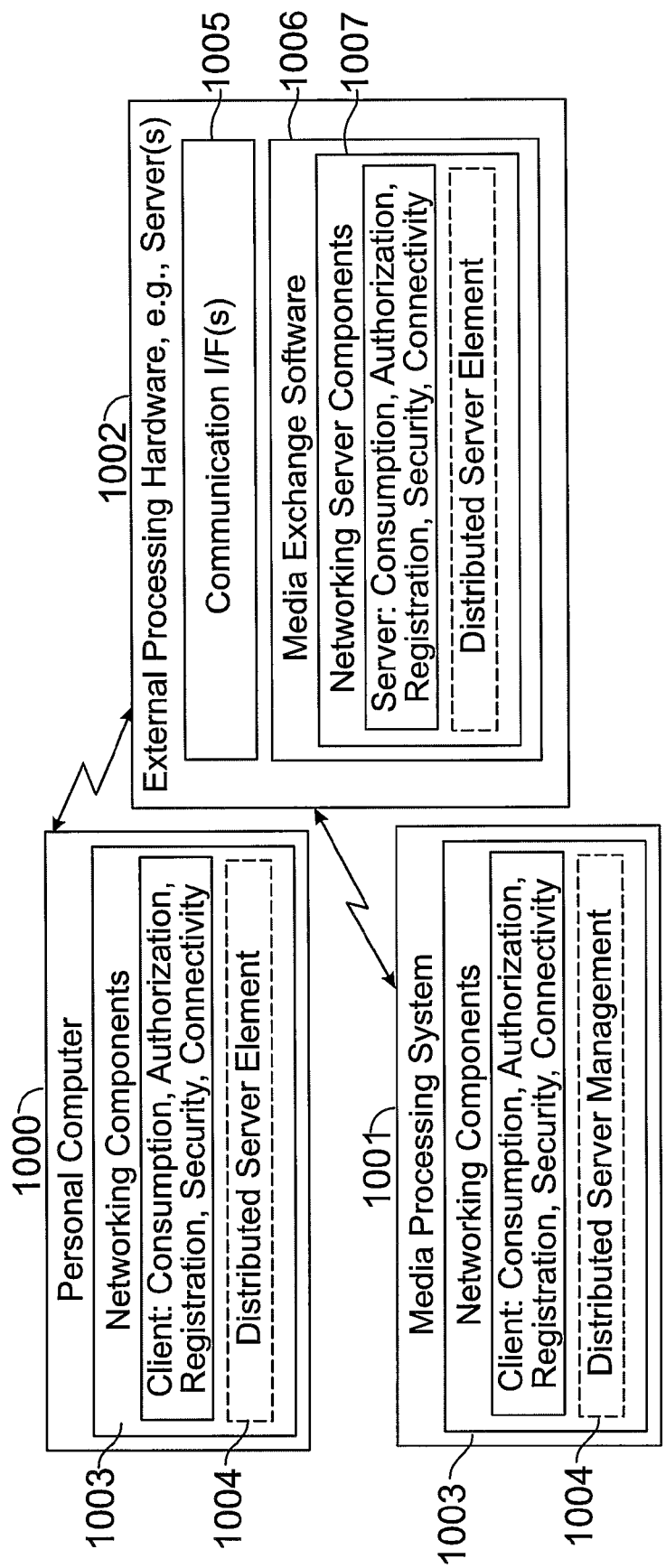
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
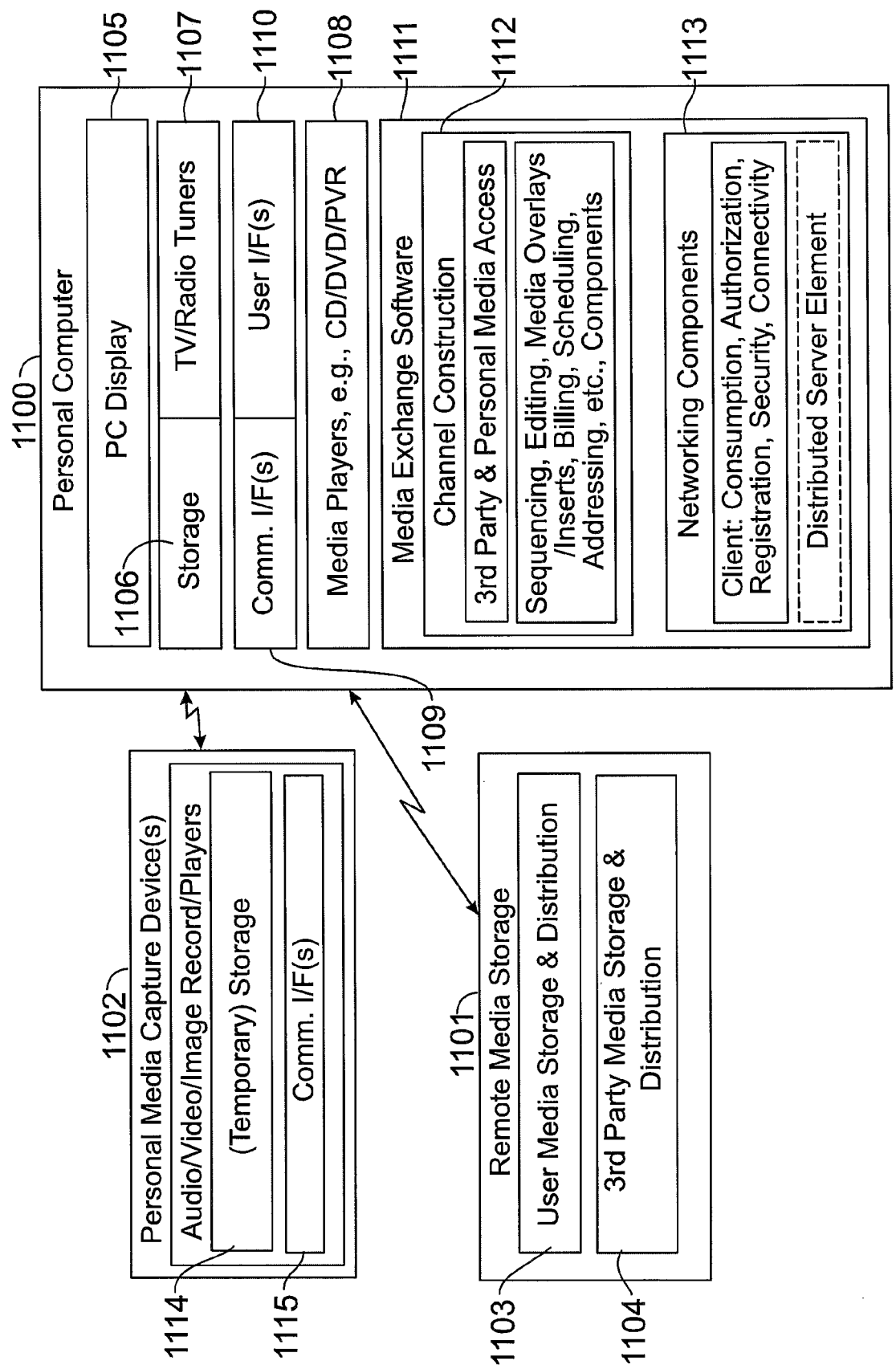
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Various embodiments of the present invention include a system and method that provide for management of multimedia display content in a media exchange network.

Aspects of the present invention may be found in a system supporting the management of multimedia display content in a communication network. Such a system may comprise a television display, at a first location, supporting the consumption of media, and a first storage for storing media, at the first location, and a first set top box circuitry, at the first location. The first storage may have an associated first network address, and the first set top box may communicatively couple the first storage to the communication network. An embodiment may comprise a user interface having at least one view comprising a representation of media available for consumption. The user interface may support the selection and scheduling of media for delivery to a second location.

In addition, an embodiment in accordance with the present invention may comprise a second set top box, at a second location, and at least one multimedia display, at the second location, communicatively coupled to the second set top box. The at least one multimedia display may have an associated second network address. Such an embodiment may also comprise server software that receives a request identifying one of the first and second associated network addresses. The server software may respond by identifying the other of the associated first and second network addresses to support delivery of media from the first set top box to the at least one multimedia display for consumption.

In an embodiment of the present invention, the media may comprise at least one of audio, a still image, video, real time video, and data, and consumption may comprise at least one of playing digitized audio, displaying a still image, displaying video, and displaying data. In various embodiments of the present invention, the associated first and second network addresses may be one of an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure, and the communication network may be the Internet.

The at least one multimedia display in an embodiment of the present invention may comprise at least one of a monochrome or color liquid crystal display (LCD), a plasma display, "electronic paper", a projection display, and a light emitting diode (LED) display. The at least one multimedia display may be communicatively coupled using a wireless link, and the wireless link may be compatible with at least one of an IEEE 802.11b or related wireless network standard, a Bluetooth-based wireless network protocol, and an infrared communication protocol. In addition, the at least one multimedia display may comprise at least one sensor for detecting a condition, at the first home. The detection may result in a change in the media displayed. The at least one sensor may comprise at least one of a visible light motion detector, passive infrared (PIR) motion detector, an ultrasonic motion detector, and a microwave motion detector.

Further aspects of the present invention may be seen in a system supporting the management of multimedia display content in a communication network. An embodiment in accordance with the present invention may comprise a television display, a storage for storing media, and set top box circuitry. The television display may support the consumption of media, the storage may be communicatively coupled to the television display, and the set top box circuitry may communicatively couple the storage to the communication network. Such an embodiment may comprise a user interface having at least one view, and the view may comprise a representation of media available for consumption. The user interface may support the selection and scheduling of media for delivery.

An embodiment of the present invention may comprise at least one multimedia display, communicatively coupled to the set top box, and software that receives a request. The software may respond by coordinating delivery of media from the set top box to the at least one multimedia display for consumption. The media in such an embodiment may comprise at least one of audio, a still image, video, real time video, and data, and consumption may comprise at least one of playing digitized audio, displaying a still image, displaying video, and displaying data. The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The at least one multimedia display may comprise at least one of a monochrome or color liquid crystal display (LCD), a plasma display, "electronic paper", a projection display, and a light emitting diode (LED) display. The at least one multimedia display may be communicatively coupled to the set top box using a wireless link, and the wireless link may be compatible with at least one of an IEEE 802.11b or related wireless network standard, a Bluetooth-based wireless network protocol, and an infrared communication protocol.

In an embodiment in accordance with the present invention, the at least one multimedia display may comprise at least one sensor for detecting a condition, at the first home, and the detection of the condition may result in a change in the media displayed. In various embodiments of the present invention, the at least one sensor may comprise at least one of a visible light motion detector, passive infrared (PIR) motion detector, an ultrasonic motion detector, and a microwave motion detector.

Yet other aspects of the present invention may be observed in a method of supporting the management of multimedia display content in a communication network. In an embodiment of the present invention, the method may comprise receiving input from a user, and scheduling media for delivery from a first location to a second location based on input from the user. The method may also comprise delivering media from the first location to the second location, via the communication network, if media is scheduled for delivery, and refraining from delivering media from the first location to the second location, via the communication network, if media is not scheduled for delivery. The media may comprise at least one of audio, a still image, video, and data.

In various embodiments of the present invention, the communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The user input may be received via a user interface having at least one view. The at least one view may comprise a representation of at least one user defined media channel supporting consumption of media. The delivery may comprise authenticating the first location to the second location, and sending a request to transfer media, from the first location to the second location. Such an embodiment may also comprise receiving a response, at the first location from the second location, and transferring the media, from the first location to the second location, if the response is an acceptance of the transfer of media. An embodiment of the present invention may refrain from transferring the media, from the first location to the second location, if the response is not an acceptance of the transfer of media.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A set-top box supporting management of multimedia display content, the set-top box comprising:
at least one processor that, during operation, communicatively couples to a first storage at a first home for storing media, the first storage having an associated first network address, the at least one processor operable to:
communicatively couple to a display device, at the first home, the display device supporting consumption of the media;
cause display of a user interface on the display device, the user interface having at least one view representing the media available for the consumption, the user interface supporting selection and scheduling of the media for delivery over a communication network to at least one multimedia display at a second home, the at least one multimedia display including at least one sensor for detecting a condition at the first home resulting in a change in the media displayed, wherein the at least one sensor includes at least one of a visible light motion detector, a passive infrared (PIR) motion detector, an ultrasonic motion detector, and a microwave motion detector; and
communicatively couple over the communication network to another set-top box at the second home, the another set-top box having an associated second network address authenticated with respect to the associated first network address via server software, the server software maintains a user defined association of the first associated network address and the associated second network address to facilitate delivery of the media over the communication network from a first end user device to the at least one multimedia display at the second home for consumption.

2. The set-top box of claim 1 wherein the media comprises one or more of audio, a still image, video, real time video, and/or data.

3. The set-top box of claim 1 wherein the consumption comprises one or more of playing digitized audio, displaying a still image, displaying video, and/or displaying data.

4. The set-top box of claim 1 wherein the associated first and second network addresses are one of an Internet protocol (IP) address, a media access control (MAC) address, or an electronic serial number (ESN).

5. The set-top box of claim 1 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

6. The set-top box of claim 1 wherein the communication network is the Internet.

7. The set-top box of claim 1 wherein the at least one multimedia display comprises one or more of a monochrome or color liquid crystal display (LCD), a plasma display, "electronic paper", a projection display, and/or a light emitting diode (LED) display.

8. The set-top box of claim 1 wherein the at least one multimedia display is communicatively coupled using a wireless link.

9. The set-top box of claim 8 wherein the wireless link is compatible with one or more of an IEEE 802.11b or related wireless network standard, a Bluetooth-based wireless network protocol, and/or an infrared communication protocol.

10. The set-top box of claim 1 wherein the display device comprises a television.

11. The set-top box of claim 1 wherein one or both of the first end user device and/or the second end user device comprise a television set top box.

12. A system supporting the management of multimedia display content in a communication network, the system comprising:
at least one processor arranged to operate in an end user device at a first home to communicatively couple a storage for storing media and having a first network address to a display device at the first home supporting consumption of the media, the at least one processor operable to, at least:
communicatively couple the storage to the communication network;
cause display of a user interface on the display device at the first home, the user interface having at least one view including a representation of the media available for consumption, the user interface supporting selection and scheduling of the media by a first user at the first home for delivery to a second home, wherein the first home is different than the second home;

communicatively couple to at least one multimedia display at the second home, having a second network address, the at least one multimedia display including at least one sensor for detecting a condition at the first home resulting in a change in the media displayed, the at least one sensor includes at least one of a visible light motion detector, a passive infrared (PIR) motion detector, an ultrasonic motion detector, and a microwave motion detector; and interact with software that maintains a user defined association of the first and the second network addresses, and that receives a request identifying one of the first and the second network addresses and responds by identifying the other of the first and the second network addresses and coordinating delivery of the media from the first end user device at the first home to the at least one multimedia display at the second home for consumption.

13. The system of claim 12 wherein the media comprises one or more of audio, a still image, video, real time video, and/or data.

14. The system of claim 12 wherein consumption comprises one or more of playing digitized audio, displaying a still image, displaying video, and/or displaying data.

15. The system of claim 12 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

16. The system of claim 12 wherein the at least one multimedia display comprises one or more of a monochrome or color liquid crystal display (LCD), a plasma display, "electronic paper", a projection display, and/or a light emitting diode (LED) display.

17. The system of claim 12 wherein the at least one multimedia display is communicatively coupled using a wireless link.

18. The system of claim 17 wherein the wireless link is compatible with one or more of an IEEE 802.11b or related wireless network standard, a Bluetooth-based wireless network protocol, and/or an infrared communication protocol.

19. The system of claim 12 wherein the display device comprises a television.

20. The system of claim 12 wherein the end user device comprises a television set top box.

21. The system of claim 12 wherein the at least one multimedia display is communicatively coupled to a second end user device.

22. The system of claim 21 wherein the second end user device comprises storage for storing media received for display on the at least one multimedia display.

23. The system of claim 21 wherein the second end user device comprises a television set top box.

24. An integrated circuit device that supports the management of multimedia display content in a communication network, the device comprising:

at least one processor arranged to operably couple to circuitry of an end user device at a first home, the at least one processor arranged to communicatively couple to support the management of display of media content at a second home, the at least one processor operable to, at least:

cause display of a user interface on a first display device at the first home, having at least one view comprising a representation of the media content available for consumption, the user interface supporting the selection and scheduling of the media content by a first user at the first home for delivery to the second home, wherein the first home is different than the second home;

communicate with software that maintains a user defined association of first and second network addresses with respect to first and second users, respectively, at the first and second homes, respectively, wherein the first and second users are known to one another, wherein the software receives a request identifying one of the first or second network address, and that responds by identifying the other of the first or second network addresses to support delivery of the media content from the end user device at the first home to at least one multimedia display at the second home for consumption, the at least one multimedia display including at least one sensor for detecting a condition at the first home resulting in a change in the media content displayed, the at least one sensor including at least one of a visible light motion detector, a passive infrared (PIR) motion detector, an ultrasonic motion detector, and/or a microwave motion detector.

25. The device of claim 24 wherein the media content comprises one or more of audio, a still image, video, real time video, and/or data.

26. The device of claim 24 wherein consumption comprises one or more of playing digitized audio, displaying a still image, displaying video, and/or displaying data.

27. The device of claim 24 wherein the first and second network addresses are one of an Internet protocol (IP) address, a media access control (MAC) address, or an electronic serial number (ESN).

28. The device of claim 24 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

29. The device of claim 24 wherein the communication network is the Internet.

30. The device of claim 24 wherein the at least one multimedia display comprises one or more of a monochrome or color liquid crystal display (LCD), a plasma display, "electronic paper", a projection display, and/or a light emitting diode (LED) display.

31. The device of claim 24 wherein the at least one multimedia display is communicatively coupled using a wireless link.

32. The device of claim 31 wherein the wireless link is compatible with one or more of an IEEE 802.11b or related wireless network standard, a Bluetooth-based wireless network protocol, and/or an infrared communication protocol.

* * * * *